US 008768763B2

(12) United States Patent
Horvitz et al.

(10) Patent No.: US 8,768,763 B2
(45) Date of Patent: Jul. 1, 2014

(54) ONLINE MARKETPLACE WITH SHIPPING INCENTIVES

(75) Inventors: Eric Horvitz, Kirkland, WA (US); Gur Kimchi, Bellevue, WA (US); Lili Cheng, Bellevue, WA (US); Doug Burger, Bellevue, WA (US); Stelios Paparizos, San Jose, CA (US); Marc Davis, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 31 days.

(21) Appl. No.: 13/174,309

(22) Filed: Jun. 30, 2011

(65) Prior Publication Data

US 2013/0006739 A1 Jan. 3, 2013

(51) Int. Cl.
G06Q 30/00 (2012.01)
(52) U.S. Cl.
USPC ..................................................... 705/14.23
(58) Field of Classification Search
USPC ........................................................ 705/14.23
See application file for complete search history.

(56) References Cited

U.S. PATENT DOCUMENTS

| 7,552,067 | B2 | 6/2009 | Nephew et al. |
| 7,881,959 | B2 | 2/2011 | Ramsey et al. |
| 2003/0093388 | A1 | 5/2003 | Albright |
| 2005/0075952 | A1 | 4/2005 | Zhang et al. |
| 2010/0228604 | A1 | 9/2010 | Desai et al. |
| 2010/0274609 | A1 | 10/2010 | Shoemaker et al. |

FOREIGN PATENT DOCUMENTS

| KR | 1020020061262 A | 7/2002 |
| KR | 1020060122723 A | 11/2006 |

OTHER PUBLICATIONS

"International Search Report", Mailed Date: Nov. 28, 2012, Application No. PCT/US2012/043648, Filed Date: Jun. 21, 2012, pp. 9.
Wang, et al., "Coordination of Supply Chain with Advertise-Setting Newsvendor", Retrieved at <<http://ieeexplore.ieee.org/stamp/stamp.jsp?tp=&arnumber=5486994>>, Proceedings of 2nd International Conference on Advanced Computer Control, Mar. 29, 2010, pp. 391-395.
Cachon, Gerard P., "Managing Supply Chain Demand Variability with Scheduled Ordering Policies", Retrieved at <<http://opimweb.wharton.upenn.edu/documents/research/Cachon_ms_demvar.pdf>>, Management Science, vol. 45 No. 6, Jun. 1999, pp. 843-856.
Intaher, Marcus., "Agile Supply Chain: Strategy for Competitive Advantage", Retrieved at <<http://www.isma.info/dosyalar/05-17_AGILE_SUPPLY_CHAIN_STRATEGY_FOR_COMPETITIVE_ADVANTAGE_%28Intaher_Marcus_AMBE%29.pdf>>, Journal of Global Strategic Management, Jun. 2010, pp. 5-17.

(Continued)

*Primary Examiner* — Daniel Sorkowitz
(74) *Attorney, Agent, or Firm* — Joann Dewey; Micky Minhas

(57) ABSTRACT

A marketplace server and method for facilitating purchase transactions are provided. A marketplace server may include a routing engine configured to receive an order for goods from a first computing device associated with a first customer, with the order including a first delivery address of the customer. The routing engine also calculates a delivery route to the first delivery address. An offer engine is configured to create an offer for other goods. The offer includes a shipping incentive associated with a second delivery address of a second customer. The offer may be targeted to the second customer based on a proximity of the second delivery address to the delivery route. The offer engine sends the offer to a second computing device associated with the second customer. Upon receiving an acceptance of the offer from the computing device, the offer engine processes a purchase transaction for the offer.

19 Claims, 5 Drawing Sheets

(56) References Cited

OTHER PUBLICATIONS

Juttner, et al., "Demand Chain Management—Integrating Marketing and Supply Chain Management", Retrieved at <<http://martin-christopher.info/wp-content/uploads/2009/12/Demand-Chain-Management-Integrating-Marketing-and-Supply-Chain-Management.pdf>>, Oct. 26, 2004, pp. 39.

Wolfe, Michale., "Business Decisions Based on Supply & Demand", Retrieved at <<http://www.ehow.com/info_7748465_business-decisions-based-supply-demand.html>>, Retrieved Date: Mar. 31, 2011, pp. 3.

ONLINE MARKETPLACE WITH SHIPPING INCENTIVES

BACKGROUND

On-line shopping services enable customers to purchase goods and/or services from a merchant. When finished goods are purchased, such goods may be delivered from a manufacturing site, warehouse or distribution center to a customer via one or more modes of transportation. Costs associated with the delivery of such goods will depend upon several factors, such as the mode of transportation (truck, boat, airplane, etc.), the delivery route, and the distance traveled of the transporting vehicle(s). Shipping and handling charges related to such delivery costs are typically passed on from the merchant to the customer.

In some cases, the shipping and handling charges may increase the total price of an on-line offer just beyond a potential customer's willingness to pay. Further, a delivery address for a potential customer may be on or close to an upcoming delivery route for an existing order. In such a case, shipping costs for a product ordered from the potential customer would be significantly reduced. This would enable the merchant to offer a lower total price for the product. However, the merchant is unable to predict future delivery addresses and their relationship to upcoming delivery routes. The merchant also has no way to communicate with potential customers, for example, to learn that a customer may be willing to purchase a product if the shipping charges are reduced or waived. Lacking this information, additional sales may be lost, and willing buyers and willing sellers may miss opportunities to consummate sales that would be of mutual benefit.

SUMMARY

Systems and methods for facilitating purchase transactions including shipping incentives are disclosed herein. In one example a marketplace server includes a routing engine that is configured to receive an order for goods from a first customer via a first computing device. The order includes a delivery address of the first customer. The routing engine is configured to calculate a delivery route to the delivery address. The marketplace server also includes an offer engine that is configured to create an offer for other goods. The offer is targeted to a second customer based on a proximity of the second customer's delivery address to the delivery route. The offer also includes a shipping incentive associated with the second customer's delivery address. The offer engine sends the offer to a second computing device associated with the second customer. Upon receiving an acceptance of the offer from the second computing device, the offer engine processes a purchase transaction for the offer This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
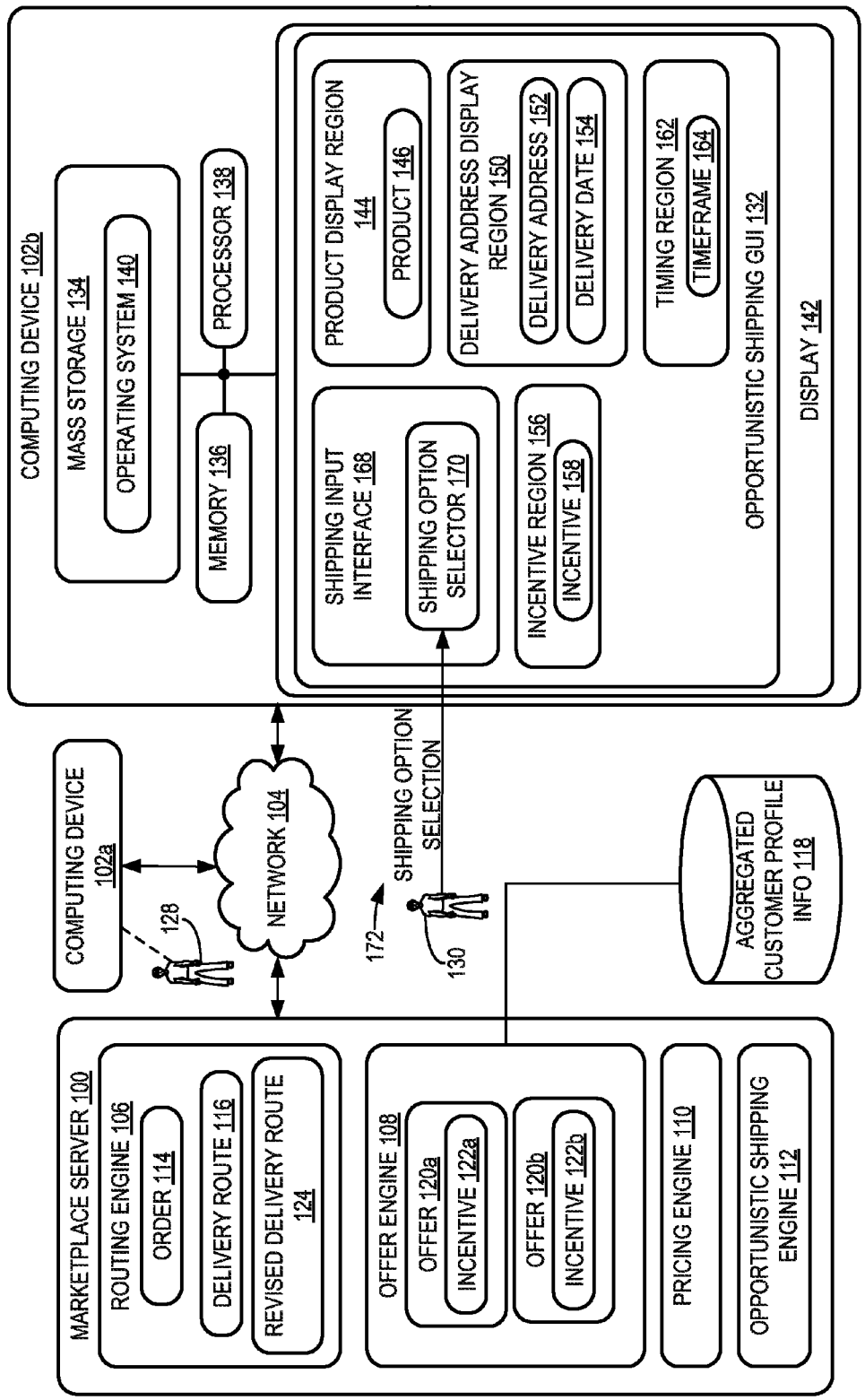
FIG. 1 is a schematic view of one embodiment of a marketplace server for facilitating purchase transactions including shipping incentives.

FIG. 1 is a schematic view of a marketplace server 100 for facilitating purchase transactions including shipping incentives. The purchase transactions may be between a merchant associated with the marketplace server 100 and customers associated with computing devices 102, including computing devices 102*a* and 102*b*. The marketplace server 100 communicates with the computing devices 102 through a network 104.

As described in more detail below, the marketplace server 100 includes a routing engine 106, an offer engine 108, a pricing engine 110, and an opportunistic shipping engine 112. In the following description, the routing engine 106, offer engine 108, pricing engine 110, and opportunistic shipping engine 112 are described as executed on the marketplace server 100. It will be appreciated that marketplace server 100 may be implemented as one or more coordinated servers, which may be co-located in a server farm or distributed in multiple different locations, as desired.

In different examples, the computing devices 102 may take the form of desktop computers, laptop computers, tablet computers, home entertainment computers, network computing devices, mobile computing devices, mobile communication devices, gaming devices, etc. Additionally, the network 104 may take the form of a local area network (LAN), wide area network (WAN), wired network, wireless network, personal area network, or a combination thereof, and may include the Internet.

The marketplace server 100 is associated with a merchant that desires to sell goods to customers associated with computing devices 102. The routing engine 106 may receive an order 114 for goods via the network 104 from a first customer 128 using the computing device 102*a*. The order 114 may include a requested shipping method, such as standard ground delivery, 2-Day delivery, Next-Day delivery, etc., and a delivery address for delivering the goods to the first customer 128. The routing engine 106 calculates a delivery route 116 for delivering the goods to the delivery address of the first customer 128.

The offer engine 108 on the marketplace server 100 then identifies a second customer 130 who may be interested in purchasing other goods from the merchant associated with the marketplace server, and who may be a candidate for receiving a shipping incentive as described in more detail below. In one example, the second customer 130 may be identified through his or her use of a computing device, such as computing device 102*b*, to access various services across the network 104, including services provided by the marketplace server 100. Such services may include, but are not limited to, search services, email services, e-commerce services, social networking services, document server services, web applications, etc.

As the second customer 130 interacts with the marketplace server 100, a customer profile of the second customer 130 may be generated over time. The customer profile may include, for example, one or more delivery addresses that the second customer 130 has provided in previous purchases from merchants associated with the marketplace server 100. It will be appreciated that the customer profile may include additional information, such as demographic information, product, service and application preferences, entertainment interests, social graph information, etc. Aggregated customer profile information for the second customer 130 and other customers may be stored in an aggregated customer profile information database 118.

In one example, the offer engine 108 may be configured to identify the second customer 130 by referencing a social graph of the first customer 128, and by determining a relationship between the first customer 128 and the second customer 130. The offer engine 108 may retrieve social graph information related to the first customer 128 from the aggregated customer profile information database 118. By referencing the delivery route 116 associated with the order 114 from the first customer 128, and noting the relationship between the first customer 128 and the second customer 130, the offer engine 108 may present an offer to the second customer 130 that leverages the upcoming shipment to the first customer along the delivery route 116.

In another example, the second customer's interactions with the marketplace server 100 may suggest that the second customer 130 may be interested in purchasing one or more products sold by a merchant associated with the marketplace server. In one use case example, the second customer 130 may enter a product search query on an e-commerce website hosted by the marketplace server 1.00. Upon receiving the search query, the offer engine 108 of the marketplace server 100 may access the aggregated customer profile information database 118 and retrieve profile information for the second customer 130, including previous delivery addresses provided by the second customer 130 for purchases made via the marketplace server.

The offer engine 108 may determine that a previous delivery address associated with the second customer 130 is along or near the delivery route 116 associated with the existing order 114. The offer engine 108 may also determine that making an additional delivery stop along the delivery route 116 would add incremental, and perhaps negligible, shipping costs to those costs already expected for the existing order 114. The offer engine 108 may then create an offer 120*a* targeted to the second customer 130 based on the proximity of the second customer's previous delivery address to the delivery route 116. The offer 120*a* may be for a product related to the search query submitted by the second customer 130, and may include a shipping incentive 122*a* associated with shipping the product to the previous delivery address of the second customer.

In another example, where a previous delivery address used by the second customer 130 would require a detour from the delivery route 116, the routing engine 106 may be configured to modify the delivery route 116 to create a revised delivery route 124 based on delivering the product to the previous delivery address. In this case, a pricing engine 110 executed on the marketplace server 100 is configured to calculate an incremental shipping cost associated with the revised delivery route 124. This incremental shipping cost may be used by the offer engine 108 to determine the amount of the incentive 122*a* to include with the offer 120*a*.

The offer engine 108 may also be configured to identify an alternative delivery address for the second customer 130. The alternative delivery address may not be a preferred delivery address of the second customer 130, but may enable the merchant to offer an improved incentive for delivery to the alternative delivery address. In one example, the offer engine 108 may identify an alternative delivery address from other delivery addresses that the second customer 130 has provided in previous purchases from the marketplace server 100. In another example, the offer engine 108 may identify an alternative delivery address from information gathered from the aggregated customer profile information database 118.

The alternative delivery address may be directly on or closer to the delivery route 116 than a preferred delivery address of the second customer 130. For example, a preferred delivery address may be associated with the primary residence of the second customer 130, while an alternative delivery address may be associated with a workplace, second home or other location at which the second customer 130 may periodically be located or visit. The alternative delivery address could also be the address of a friend, relative or other trusted acquaintance of the second customer 130. The offer engine 108 may create a second offer 120*b* that includes an alternative delivery address as a delivery location, along with a corresponding shipping incentive 122*b* associated with delivery to this address. It will be appreciated that one or more additional offers including other alternative delivery addresses may also be provided to the second customer 130.

The shipping incentives 122 may include a shipping discount for accepting delivery at a designated address on a specified date that corresponds to the shipment of the existing order 114. In one example, the existing order 114 may be scheduled to ship on July 1. The offer 120*a* may include an option for the second customer 130 to select delivery on July 1 at a delivery address previously used by the second customer for a discounted shipping charge. The merchant associated with the marketplace server 100 may also need sufficient lead time to process the order associated with offer 120*a* in time for the July 1 delivery date. Accordingly, in one example the offer 120*a* and corresponding shipping incentive 122*a* may expire at the end of a timeframe, such as 2 days, 1 day, 12 hours, or other suitable timeframe.

A shipping incentive 122 may also be associated with an alternative delivery address that provides more favorable tax treatment and/or other lower secondary fees for delivery at this address, where permissible. For example, where the first offer 120*a* includes a delivery address associated with a sales tax, the second offer 120*b* may include an alternative delivery address that is associated with zero sales tax.

In another example, a shipping incentive 122 may include a more secure shipping method, such as providing enhanced packaging for fragile, hazardous or expensive items, and/or a guarantee of product condition or quality upon delivery. For example, a high quality, enamel-coated cast iron pot could develop cracks during shipping due to inadequate packaging, rough handling, or other shipment-related issues. For this product, the offer engine 108 may create a shipping incentive 122 that includes a guarantee of product condition upon delivery. The customer may also be given an option to pick up the item at a retail store or warehouse. Additionally, some customers may be unaware of potential hazards associated with shipping certain products. Accordingly, the offer engine 108 may alert the customer to possible shipping/handling concerns with respect to the product, and call the customer's attention to one or more shipping incentives 122 and/or other options for protecting or guaranteeing product quality or condition.

In a further example, a shipping incentive 122 may include an option for free returns should the customer be dissatisfied with the product. Such an incentive may be appropriate, for example, for clothing, fashion accessories and other items associated with the personal taste of the purchaser. This type of incentive may also be desirable for collectibles, expensive jewelry, designer products, and other items that may be subject to copying or counterfeiting. A customer may also be given an option to see the item in person, such as at a retail store, before being charged for the purchase.

The offer engine 108 may send one or more offers 120 and corresponding shipping incentives 122 to the computing device 102b associated with the second customer 130. In an example where the second customer 130 enters a product search query on an e-commerce website hosted by the marketplace server 100, the offer engine may deliver the one or more offers 120 along with the search results to the second computing device 102b. Upon receiving an acceptance of one of the offers 120, the offer engine 108 may process a purchase transaction between the merchant and the second customer 130 for the accepted offer.

The marketplace server 100 may also include an opportunistic shipping engine 112 that is configured to serve an opportunistic shipping graphical user interface (e.g., GUI) 132 for display on the second computing device 102b. The second computing device 102b includes mass storage 134, memory 136, and a processor 138. An operating system 140 and other programs stored in mass storage 134 may be executed by the processor 138 using memory 136 to achieve various functions. In other embodiments computing device 102b may include other components not shown in FIG. 1, such as user input devices including keyboards, mice, and/or touch screens, for example. It will be appreciated that computing device 102a may operate in a similar manner as computing device 102b, and may have the same, additional or fewer components as computing device 102b.

The opportunistic shipping GUI 132 may be displayed on display 142 of computing device 102b and may include a product display region 144 for displaying and/or describing a product 146 that is the subject of the offer 120a. The opportunistic shipping GUI 132 also includes a delivery address display region 150 that displays a delivery address 152 that is associated with the offer 120a. The delivery address display region 150 may also display a delivery date 154 corresponding to the date that the product 146 will be delivered to the second customer 130 at the delivery address 152. Proximate to the delivery address display region is an incentive region 156 that displays a shipping incentive 158 associated with the second customer 130 accepting the offer 120a for delivery at the delivery address 152. The opportunistic shipping GUI 132 also includes a timing region 162 that displays a timeframe 164 during which the shipping incentive 158 and corresponding offer 120a are valid. The delivery address display region 150 further includes a shipping input interface 168 that includes a shipping option selector 170 configured to receive input from the second customer 130. Using the shipping option selector 170, the second customer 130 may input a desired shipping option selection 172. It will be appreciated that the shipping input interface 168 may include multiple shipping option selectors 170 corresponding to multiple delivery addresses 152, corresponding delivery dates 154 and shipping incentives 158 that comprise multiple offers 120.

Figure 2:
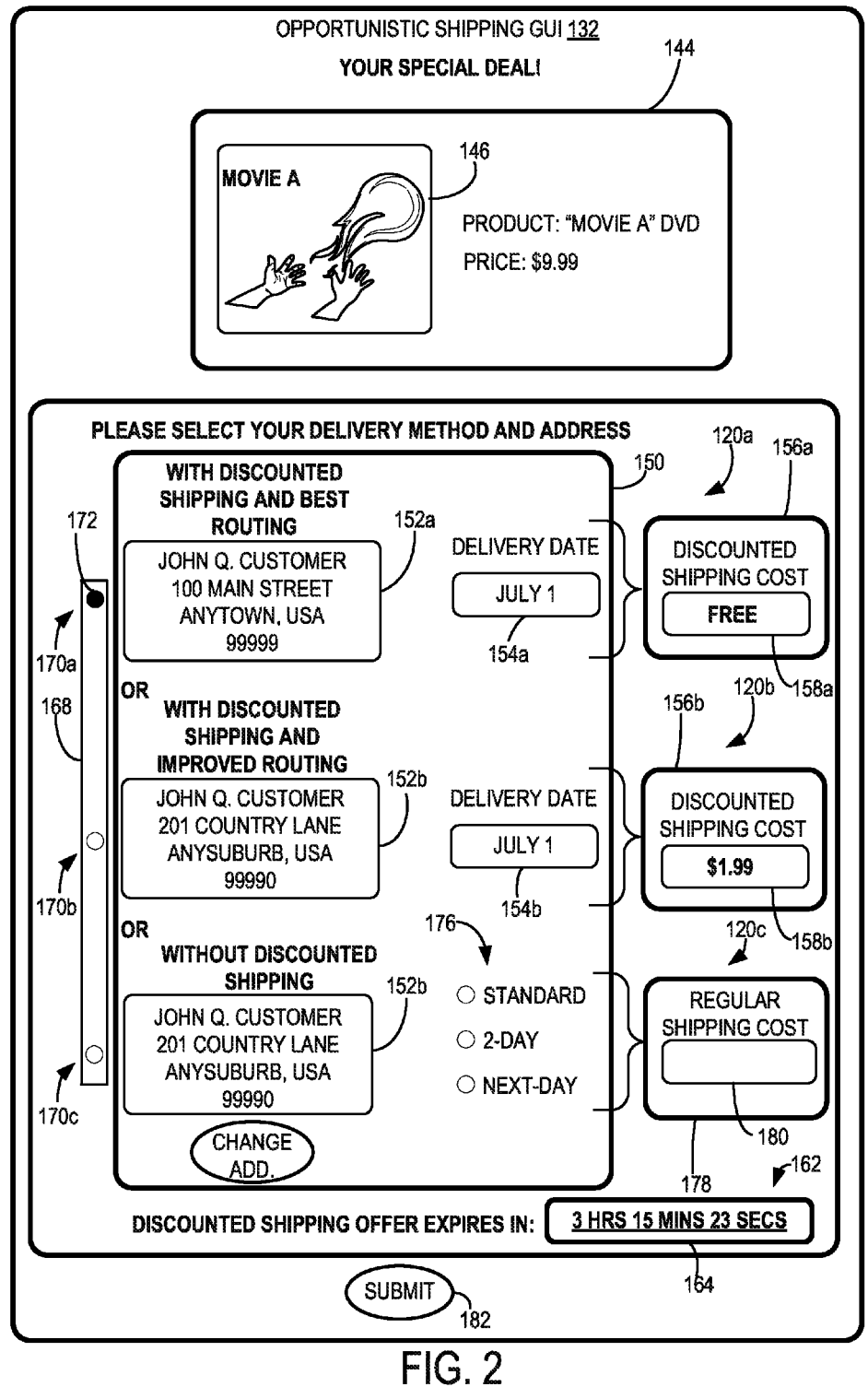
FIG. 2 is a schematic view of an example screen of the opportunistic shipping graphical user interface of FIG. 1.

FIG. 2 is a schematic view of an example screen of the opportunistic shipping GUI 132 of FIG. 1. In the example shown in FIG. 2, the offer engine 108 of the marketplace server 100 has created offers 120a and 120b for a product 146, in this case a DVD of "Movie A." An image, title and price of the DVD are displayed in the product display region 144. In other examples additional product descriptions and related information may also be provided. As explained in more detail below, each of the offers 120a and 120b include different delivery addresses 152 and/or incentives 158. In this example, a third offer 120c that does not include a shipping incentive, but includes regular shipping options and costs instead, is also provided.

Offer 120a includes a delivery address 152a and a corresponding delivery date 154a displayed in the delivery address display region 150. The incentive region 156a is proximate to the delivery date 154a and displays the corresponding shipping incentive 158a for this shipping option. In this example, the offer engine 108 determines that a work address previously used for purchases by the second customer 130 is along (i.e., within a threshold time, cost, or distance deviation of) the delivery route 116 for the existing order 114. The existing order is scheduled to be delivered on July 1. Thus, the second customer's work address is displayed as the delivery address 152a along with a delivery date 154a of July 1. As the second customer's work address is along the delivery route 116, the offer engine 108 determines that no shipping costs are necessary for this offer 120a, and free shipping may be included. Thus, the incentive region 156a displays a shipping incentive 158a of free shipping. While the second customer's work address may not be the second customer's preferred location for delivery of the product 146, the incentive of free shipping may encourage the second customer to select this delivery location and corresponding offer 120a.

The shipping input interface 168 includes a shipping option selector 170a proximate to the delivery address 152a of the first offer 120a. The shipping option selector is configured to receive input of a shipping option selection 172 from the second customer 130. While a radio button is illustrated herein for the shipping option selector 170a, it will be appreciated that a variety of other input mechanisms, such as checkboxes, sliders, etc., may be utilized. In the illustrated example, the second customer 130 has chosen offer 120a by selecting the shipping option selector 170a.

Another offer 120b presented to the second customer 130 includes a second delivery address 152b and a corresponding delivery date 154b in the delivery address display region 150. The incentive region 156b proximate to the delivery date 154b displays the corresponding shipping incentive 158b for this shipping option. In this example, the offer engine 108 selects a home address previously used for purchases by the second customer 130. While not along the delivery route 116 for the existing order 114, the home address is near the delivery route 116 such that the routing engine 106 may create a revised delivery route 124 that is suitable for both the existing order 114 and the offer 120b. Thus, the second customer's home address is displayed as the delivery address 152b along with the delivery date 154b of July 1 corresponding to the delivery date of the existing order 114. As delivery to the second customer's home address requires a revised delivery route 124, the pricing engine 110 determines an incremental shipping cost based on the costs associated with the revised delivery route. In this example, the incentive region 156b displays a shipping incentive 158b corresponding to a discounted shipping cost of $1.99.

The shipping input interface 168 includes a shipping option selector 170b in the form of a radio button proximate to the delivery address 152b of the second offer 120b. The shipping option selector is configured to receive input of a shipping option selection 172 from the second customer 130. In the illustrated example, the second customer 130 has not selected the shipping option selector 170b.

A third offer 120c may also be presented that provides standard shipping options and regular, non-discounted shipping costs. In this example, the third offer 120c includes the second customer's home delivery address 152b and shipping options 176, including standard, 2-day, and Next-day shipping, in the place of a delivery date. Depending upon the shipping option 176 selected by the second customer, a shipping cost region 178 will display a corresponding regular shipping cost 180 for the selected shipping option. The shipping input interface 168 includes a shipping option selector 170c in the form of a radio button proximate to the delivery address 152b of the third offer 120c. The shipping option selector 170c is configured to receive input of a shipping option selection 172 from the second customer 130. In the illustrated example, the second customer has not selected the shipping option selector 170c.

The opportunistic shipping GUI 132 further includes a timing region 162 that displays a timeframe 164 during which the shipping incentives 158 and corresponding offers 120a and 120b are valid. As the offers 120a and 120b include incentives 158 associated with the existing delivery route 116 that corresponds to a fixed shipping date, the merchant may require an acceptance of one of the offers within a timeframe that allows sufficient lead time for the merchant to process the new order. In this example, the timeframe 164 includes a timer displaying hours, minutes, and seconds that is counting down to a predetermined deadline for placing the new order. If the timer reaches zero and the second customer 130 has not accepted offer 120a or 120b and completed an order, then offers 120a and 120b are withdrawn. Such a withdrawal may be indicated by graying out offers 120a and 120b and corresponding shipping option selectors 170a and 170b. Once the second customer 130 chooses one of the offers 120 by selecting one of the shipping option selectors 170, the second customer may select a "submit" button 182 and proceed to complete the order.

Figure 5:
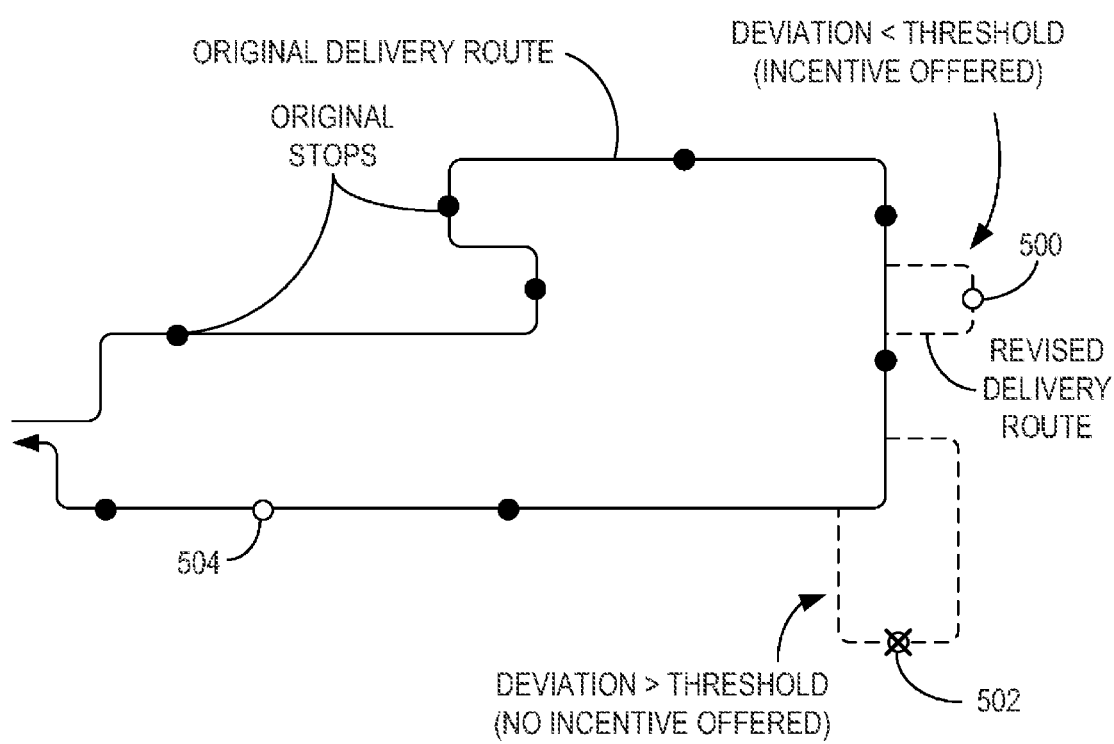
FIG. 5 is a schematic illustration of an original delivery route and a revised delivery route generated by the system of FIG. 1.

FIG. 5 is a schematic illustration of an original delivery route and a revised delivery route generated by the system of FIG. 1. An original delivery route is illustrated with original stops along the route. At 500, a delivery address is shown that is positioned along the delivery route, within a threshold deviation, which may be a threshold time, cost, or distance deviation, such as 5 minutes, $2 of additional fuel and labor costs, or 0.25 miles, as examples. Since the deviation is within the threshold, an incentive is offered as described above, and if accepted, the delivery address 500 is added to the route to produce a revised delivery route. At 502 is an example of a delivery address for which it was determined that the deviation from the original route to the delivery address at 502 exceeded the predetermined threshold, and thus no incentive was offered and the delivery address at 502 was accordingly not added to the original route. Finally, at 504 a delivery address that is directly on the original route is determined to be within a deviation threshold, and thus an incentive is offered, and if accepted, the delivery address at 504 is added to the revised delivery route. In this manner, new stops that are within a deviation threshold may be added to the original route to produce a revised delivery route.

Figure 3:
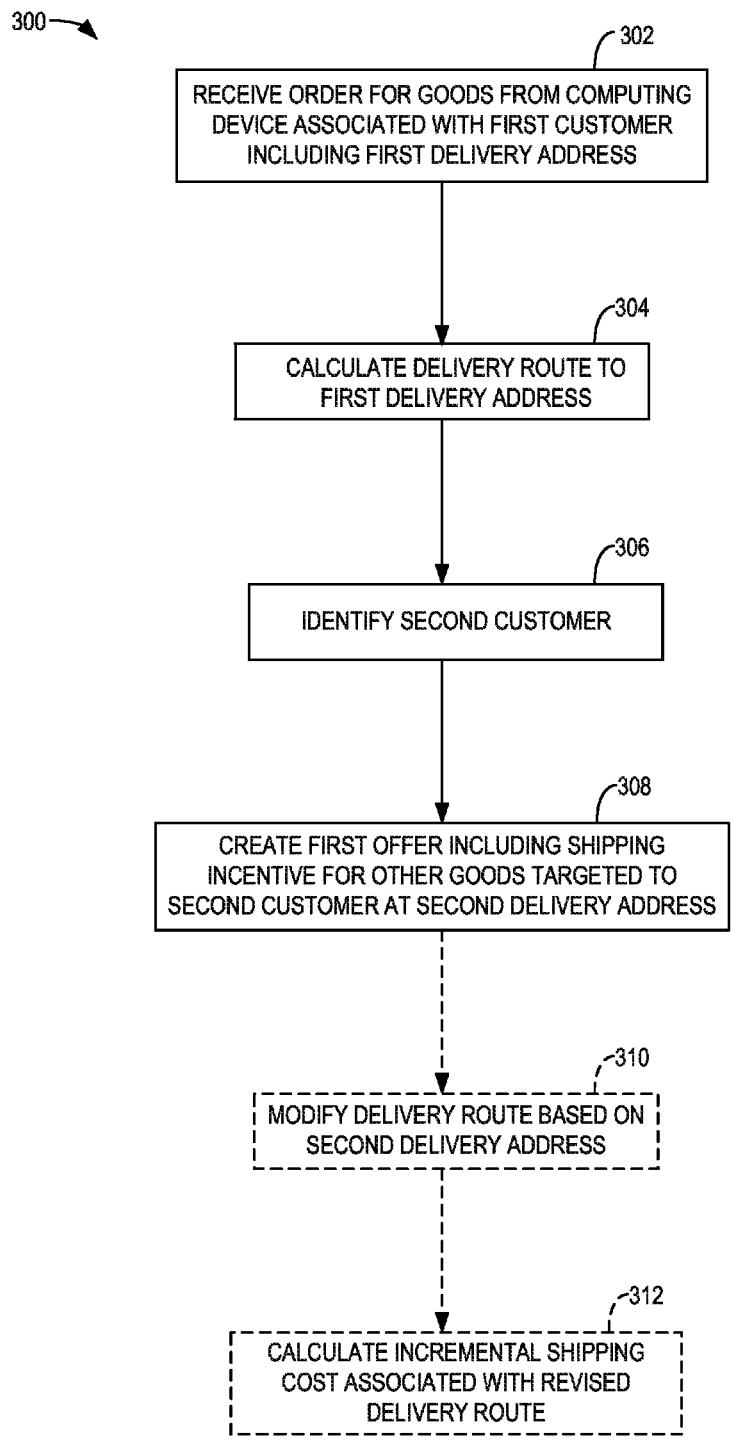
FIG. 3 is a diagram illustrating one embodiment of a method for facilitating purchase transactions including shipping incentives between a merchant associated with a marketplace server and a customer associated with a computing device.

With reference now to FIG. 3, a diagram illustrates a method 300 for facilitating purchasing transactions according to one embodiment of the present disclosure. The method may be performed using the software and hardware components of the marketplace server 100 and computing devices 102 described above and shown in FIG. 1, or using other suitable components. Method 300 begins at 302 with receiving an order for goods from a computing device, such as computing device 102a, associated with a first customer. The order includes a first delivery address of the first customer. At 304 the method includes calculating a first delivery route to the first delivery address.

At 306 the method includes identifying a second customer that uses a second delivery address that is along or near the first delivery route. In one example, a second customer may be identified by referencing a social graph of the first customer, and by determining a relationship between the first customer and the second customer. At 308 the method includes creating a first offer for other goods, and targeting the offer to the second customer that uses the second delivery address. The first offer also includes a shipping incentive associated with the second delivery address. As noted above, the shipping incentive may include a shipping discount for the second customer accepting delivery at the second delivery address on a specified date. The shipping incentive may also expire at the end of a timeframe.

As described above, where the second delivery address associated with the second customer is not along the first delivery route, a revised delivery route may be created. At 310, the method optionally includes modifying the first delivery route to a second delivery route based on the second delivery address associated with the second customer. At 312, the method may optionally include calculating an incremental shipping cost based on estimated additional costs associated with the revised delivery route.

Figure 4:
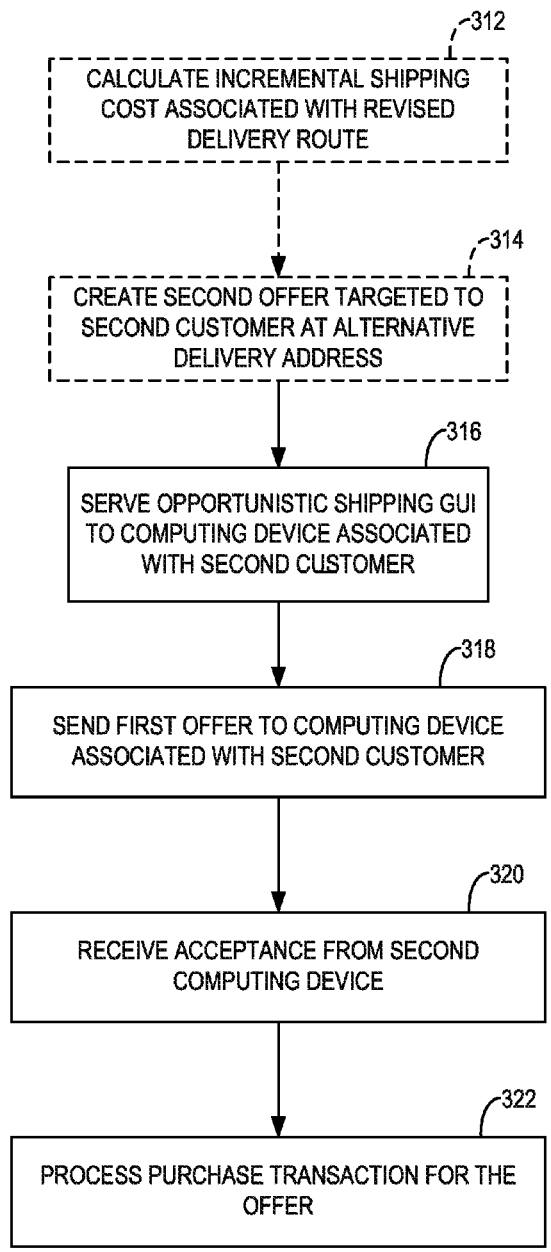
FIG. 4 is a continuation of the diagram of FIG. 3.

With reference now to FIG. 4, which is a continuation of FIG. 3, at 314 the method may optionally include creating a second offer that is associated with an alternative delivery address for the second customer. As noted above, in one example the alternative delivery address may be associated with a workplace, second home or other location at which the second customer may periodically be located or visit. At 316 the method includes serving an opportunistic shipping GUI, such as opportunistic shipping GUI 132, for display on the computing device associated with the second customer. The opportunistic shipping GUI may include a product display region displaying the product of the offer, a delivery address display region displaying a delivery address, a shipping incentive region displaying a shipping incentive associated with the offer, a timing region displaying a timeframe during which the shipping incentive is valid, and a shipping option selector configured to receive input of a second customer-selected shipping option.

At 318 the method includes sending the first offer to the computing device associated with the second customer. At 320 the method includes receiving an acceptance of the first offer from the second computing device. Upon receiving the acceptance, at 322 the method includes processing a purchase transaction for the offer.

It will be appreciated that the above described marketplace server and method may be utilized to facilitate purchase transactions between a customer and a merchant, where a delivery address associated with the customer is related to a delivery route associated with an existing order. Further, the marketplace server and method may enable a merchant to provide an offer including a shipping incentive that leverages an upcoming shipment along the delivery route. In this manner, the shipping and related transportation costs of the merchant are reduced, and the customer is provided with more attractive offers that include reduced shipping charges.

The term "engine" is used herein to refer to software that performs one or more particular functions when executed by a processor of a computing device. This term is meant to encompass individual or groups of executable files, data files, libraries, drivers, scripts, and database records, for example. The embodiments described herein show one example organization of such engines. However, it should be appreciated that the functions described herein may be accomplished by differently organized software components.

The term "service", as used herein, refers to one or more server programs that are executed on one or more server devices, which collectively respond to requests from programs executed on client devices, received over a computer network to transmit information to those. The online service described herein may take the several forms described above.

It is to be understood that the example embodiments, configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A marketplace device for facilitating purchase transactions, comprising:
   a computer;
   a routing engine executed on the marketplace device and configured to:
   receive an order for goods from a first computing device associated with a first customer, the order including a first delivery address of the first customer; and
   calculate a delivery route to the first delivery address; and
   an offer engine executed on the marketplace device and configured to:
   create an offer for other goods, the offer including a shipping incentive associated with a second delivery address of a second customer, the offer being targeted to the second customer based on a proximity of the second delivery address to the delivery route;
   send the offer to a second computing device associated with the second customer; and
   upon receiving an acceptance of the offer from the second computing device, process a purchase transaction for the offer.

2. The marketplace device of claim 1, wherein the delivery route is a first delivery route, and the routing engine is configured to modify the first delivery route to a second delivery route based on the second delivery address associated with the second customer.

3. The marketplace device of claim 2, further comprising a pricing engine executed on the marketplace device and configured to calculate an incremental shipping cost based on costs associated with the second delivery route.

4. The marketplace device of claim 1, wherein the offer engine is configured to identify the second customer by referencing a social graph of the first customer, and by determining a relationship between the first customer and the second customer.

5. The marketplace device of claim 1, wherein the shipping incentive includes a shipping discount for accepting delivery at the second delivery address on a specified date.

6. The marketplace device of claim 1, wherein the shipping incentive expires at an end of a timeframe.

7. The marketplace device of claim 1, wherein the offer is a first offer, and the offer engine is configured to create a second offer that is associated with an alternative delivery address for the second customer, and to send the second offer to the second computing device.

8. The marketplace device of claim 1, further including an opportunistic shipping engine executed on the marketplace device and configured to serve an opportunistic shipping graphical user interface for display on the second computing device of the second customer.

9. The marketplace device of claim 8, wherein the opportunistic shipping graphical user interface includes:
   a product display region displaying the other goods of the offer;
   a delivery address display region displaying a delivery address;
   a shipping incentive region displaying the shipping incentive associated with the offer; and
   a shipping option selector configured to receive input of a second customer-selected shipping option.

10. The marketplace device of claim 9, wherein the opportunistic shipping graphical user interface further includes a timing region displaying a timeframe during which the shipping incentive is valid.

11. A server-based method for facilitating purchase transactions, comprising:
   receiving at the server an order for goods from a first computing device associated with a first customer, the order including a first delivery address of the first customer;
   calculating with the server a delivery route to the first delivery address;
   creating by a computer an offer for other goods, the offer including a shipping incentive associated with a second delivery address of a second customer, the offer being targeted to the second customer based on a proximity of the second delivery address to the delivery route;
   sending from the server the offer to a second computing device associated with the second customer; and
   upon receiving at the server an acceptance of the offer from the second computing device, processing with the server a purchase transaction for the offer.

12. The method of claim 11, wherein the delivery route is a first delivery route, and further comprising modifying with the server the first delivery route to a second delivery route based on the second delivery address associated with the second customer.

13. The method of claim 12, further comprising calculating with the server an incremental shipping cost based on additional costs associated with the second delivery route.

14. The method of claim 11, further comprising identifying with the server the second customer by referencing a social graph of the first customer, and by determining a relationship between the first customer and the second customer.

15. The method of claim 11, wherein the shipping incentive includes a shipping discount for accepting delivery at the second delivery address on a specified date.

16. The method of claim 11, wherein the shipping incentive expires at an end of a timeframe.

17. The method of claim 11, wherein the offer is a first offer, and further comprising creating with the server a second offer that is associated with an alternative delivery address for the second customer.

18. The method of claim 11, further comprising serving with the server an opportunistic shipping graphical user interface for display on the second computing device of the second customer.

19. The method of claim 18, wherein the opportunistic shipping graphical user interface includes:
   a product display region displaying the other goods of the offer;

a delivery address display region displaying a delivery address;

a shipping incentive region displaying a shipping incentive associated with the offer;

a timing region displaying a timeframe during which the shipping incentive is valid; and a shipping option selector configured to receive input of a second customer-selected shipping option.

* * * * *